(12) United States Patent
Flores

(10) Patent No.: US 9,574,438 B2
(45) Date of Patent: Feb. 21, 2017

(54) FLUID VELOCITY FLOW METER FOR A WELLBORE

(71) Applicant: BAKER HUGHES INCORPORATED, Houston, TX (US)

(72) Inventor: Juan Carlos Flores, The Woodlands, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 387 days.

(21) Appl. No.: 14/253,468

(22) Filed: Apr. 15, 2014

(65) Prior Publication Data

US 2015/0292317 A1    Oct. 15, 2015

(51) Int. Cl.
| | | |
|---|---|---|
| *E21B 47/06* | (2012.01) | |
| *E21B 47/01* | (2012.01) | |
| *E21B 47/10* | (2012.01) | |
| *G01L 13/00* | (2006.01) | |

(52) U.S. Cl.
CPC .............. *E21B 47/06* (2013.01); *E21B 47/01* (2013.01); *E21B 47/10* (2013.01); *G01L 13/00* (2013.01)

(58) Field of Classification Search
CPC ............................. E21B 47/06; E21B 47/065
See application file for complete search history.

(56) References Cited

U.S. PATENT DOCUMENTS

| | | |
|---|---|---|
| 1,126,275 A | 1/1915 | Rice |
| 1,143,631 A * | 6/1915 | Keller et al. .............. G01F 1/44 |
| | | 138/40 |
| 2,042,933 A | 6/1936 | Forward |
| 3,196,680 A * | 7/1965 | Curran ...................... G01F 1/44 |
| | | 73/861.52 |
| 4,168,624 A | 9/1979 | Pichon |
| 4,231,262 A | 11/1980 | Boll |
| 4,528,847 A | 7/1985 | Halmi |

(Continued)

FOREIGN PATENT DOCUMENTS

| | | |
|---|---|---|
| WO | WO9725594 | 7/1997 |
| WO | WO03089883 | 10/2003 |

OTHER PUBLICATIONS

Schlumberger Oilfield Glossary entries for "wireline" and "coiled tubing", accessed Jun. 30, 2016 via www.glossary.oilfield.slb.com.*

(Continued)

*Primary Examiner* — Blake Michener
(74) *Attorney, Agent, or Firm* — Parsons Behle & Latimer

(57) ABSTRACT

A method and device to measure production contribution from a zone of a wellbore. The flow device include a first cylindrical portion having a first outer diameter and a second cylindrical portion having a second outer diameter smaller than the first outer diameter. The flow device includes a first pressure sensor configured to measure a first pressure at an exterior of the first portion and a second pressure sensor configured to measure a second pressure at an exterior of the second portion. The flow device is positioned adjacent a zone of a wellbore and the first and second pressures are measured. The fluid flow in the wellbore adjacent to the zone may be determined from the first and second pressures. The flow device diverts substantially all fluid flow in the wellbore around an exterior of the device. The device may include a sensor to measure the conductivity of wellbore fluid.

19 Claims, 3 Drawing Sheets

(56) References Cited

U.S. PATENT DOCUMENTS

| | | | |
|---|---|---|---|
| 4,644,800 A | 2/1987 | Kozlak | |
| 4,928,758 A * | 5/1990 | Siegfried, II | E21B 47/10 166/250.01 |
| 4,974,452 A | 12/1990 | Hunt et al. | |
| 5,174,161 A | 12/1992 | Veneruso et al. | |
| 5,265,478 A | 11/1993 | McKay et al. | |
| 5,693,891 A * | 12/1997 | Brown | G01F 1/36 73/861.04 |
| 5,736,650 A * | 4/1998 | Hiron | G01F 1/44 73/861.04 |
| 6,314,821 B1 | 11/2001 | Allan | |
| 6,604,581 B2 * | 8/2003 | Moake | E21B 43/12 166/250.07 |
| 6,874,374 B2 * | 4/2005 | Richards | G01F 1/44 73/861.53 |
| 6,935,189 B2 * | 8/2005 | Richards | G01F 1/74 73/861.04 |
| 7,293,471 B2 * | 11/2007 | Lund Bo | G01F 1/40 73/861.04 |
| 7,707,897 B2 * | 5/2010 | Ong | G01F 1/36 73/196 |
| 7,992,453 B1 * | 8/2011 | Lawrence | G01F 1/32 73/861.42 |
| 8,342,238 B2 * | 1/2013 | McCoy | E21B 43/128 166/105 |
| 8,919,209 B2 * | 12/2014 | Furlong | G01F 1/363 73/204.11 |
| 2003/0192689 A1 * | 10/2003 | Moake | E21B 43/12 166/250.01 |
| 2004/0031330 A1 * | 2/2004 | Richards | G01F 1/44 73/861.21 |
| 2004/0173010 A1 | 9/2004 | Gysling et al. | |
| 2005/0247488 A1 * | 11/2005 | Mock | E21B 4/18 175/99 |
| 2005/0269083 A1 * | 12/2005 | Burris, II | E21B 23/00 166/255.2 |
| 2006/0053902 A1 | 3/2006 | Good et al. | |
| 2009/0084536 A1 * | 4/2009 | Kenison | E21B 47/024 166/66 |
| 2014/0165715 A1 * | 6/2014 | Adil | E21B 47/065 73/152.39 |
| 2015/0021020 A1 * | 1/2015 | Whittaker | E21B 47/06 166/254.2 |

OTHER PUBLICATIONS

International Searching Authority; International Search Report and Written Opinion for Application No. PCT/US2015/025935 dated Jul. 27, 2015.

* cited by examiner

FLUID VELOCITY FLOW METER FOR A WELLBORE

BACKGROUND

Field of the Disclosure

The embodiments described herein relate to a method and apparatus for measuring fluid flow in a wellbore. Some embodiments of the apparatus may be a device that diverts substantially all of the fluid flow around the exterior of the device. Some embodiments of the method may enable the pressure to be measured at the exterior of at least two different diameters to determine the fluid flow past the device. Among other things, the device may be beneficial in determining the production contribution from a zone in a wellbore.

Description of the Related Art

During production of hydrocarbons from a wellbore, it may be beneficial to measure the production being contributed by a single zone of the wellbore. A flow meter may be positioned within the wellbore in an attempt to measure the fluid flow through the wellbore. However, prior wellbore meters only capture a portion of the fluid that is flowing through the wellbore. Conventional wellbore flow meter devices typically divert a portion of the fluid flow through an interior of the device to measure the wellbore fluid flow while the remainder of the fluid flow is diverted around the flow meter device. The use of only a portion of the wellbore fluid flow through a device to measure the total wellbore fluid flow requires the operator to estimate the actual total fluid flow through the wellbore. The reliance on an estimation of wellbore fluid flow may make it difficult to accurately determine the amount of production that a single zone is contributing to a wellbore.

SUMMARY

The present disclosure is directed to a flow meter device and method that substantially overcomes some of the problems and disadvantages discussed above.

One embodiment is a method of measuring production contribution from a zone in a wellbore comprising inserting into a wellbore a flow device that comprises a first cylindrical portion having a first outer diameter, a second cylindrical portion having a second outer diameter smaller than the first outer diameter, a first pressure sensor configured to measure a first pressure at an exterior of the first portion, and a second pressure sensor configured to measure a second pressure at an exterior of the second portion. The method comprises positioning the flow device adjacent a zone of the wellbore and measuring the first pressure with the first pressure sensor. The method comprises measuring the second pressure within the second pressure sensor and determining fluid flow in the wellbore adjacent to the zone from the first pressure and the second pressure, The first pressure sensor may include a first plurality of pressure sensors configured to measure the first pressure at the exterior of the first portion and the second pressure sensor may include a second plurality of pressure sensor configured to measure the second pressure at the exterior of the second portion. Measuring the first pressure may comprise averaging the first pressure measured from the first plurality of sensors and measuring the second pressure may comprise averaging the second pressure measure from the second plurality of sensors. The method may include measuring the first pressure at a top band, a middle band, and bottom band within the wellbore and measure the second pressure at the top band, middle band, and bottom band of the wellbore.

The method may include running the flow device into the wellbore on coiled tubing and may include pumping fluid down the coiled tubing while measuring the first pressure with the first pressure sensor and measuring the second pressure with the second pressure sensor. The method may include transmitting the pressure measurements from the first pressure sensor and the second pressure sensor to the surface. The pressure measurements may be transmitted on an electric line or fiber optic line. The method may include running the flow device into the wellbore on wireline and using a tractor to position the flow device adjacent to a zone. The method may include measuring the conductivity of fluid within the wellbore. The first and second pressure sensors may be configured to adjust the pressure measurement based on temperature. The flow device may include a memory to store pressure measurements from the first and second pressure sensors. The method may include positioning the flow device adjacent a second zone in a wellbore, measuring a first pressure adjacent to the second zone, measuring a second pressure adjacent to the second zone, and determining fluid flow in the wellbore adjacent to the second zone from the first and second pressures.

One embodiment is an apparatus to measure production contribution from a zone of a wellbore comprising a flow meter body configured to be positioned adjacent a zone in a wellbore, a first cylindrical portion of the body having a first outer diameter, a second cylindrical portion of the body having a second outer diameter smaller than the first outer diameter, a first pressure sensor configured to measure a first pressure at an exterior of the first portion, a second pressure sensor configured to measure a second pressure at an exterior of the second portion, and a memory configured to store pressure measurements from the first and second pressure sensors, wherein the body is configured so that substantially an entire fluid flow in a wellbore flows around an exterior of the flow meter body.

The apparatus may include a third cylindrical portion of the body having a third outer diameter and a third pressure sensor configured to measure a third pressure at an exterior of the third portion, wherein the memory is configured to store pressure measurements from the third pressure sensor. The first pressure sensor may be a plurality of pressure sensors and the second pressure sensor may be a plurality of pressure sensors. The body may include a central bore and the body may be connected to coiled tubing positioned within the central bore of the body. A communication line may extend from the surface and be connected to the first and second sensors. The body may be connected to a wireline with a centralizer and tractor also being connected to the wireline. The apparatus may include a plurality of sensors configured to measure the conductivity of fluid within a wellbore. The apparatus may include a sensor configured to determine the rotation of the flow meter body with respect to a high side of a wellbore.

One embodiment is a system to measure fluid flow in a wellbore. The system comprises a flow meter body, the body having a first cylindrical portion of the body having a first outer diameter and a second cylindrical portion of the body having a second outer diameter, the second outer diameter being smaller than the first outer diameter. The system includes a first pressure sensor configured to measure a first pressure between an exterior of the first cylindrical portion and a casing of a wellbore and a second pressure sensor configured to measure a second pressure between an exterior of the second cylindrical portion and the casing of the wellbore. The flow meter divers substantially all fluid flow within the wellbore between an exterior of the flow meter body and the casing of the wellbore.

Figure 1:
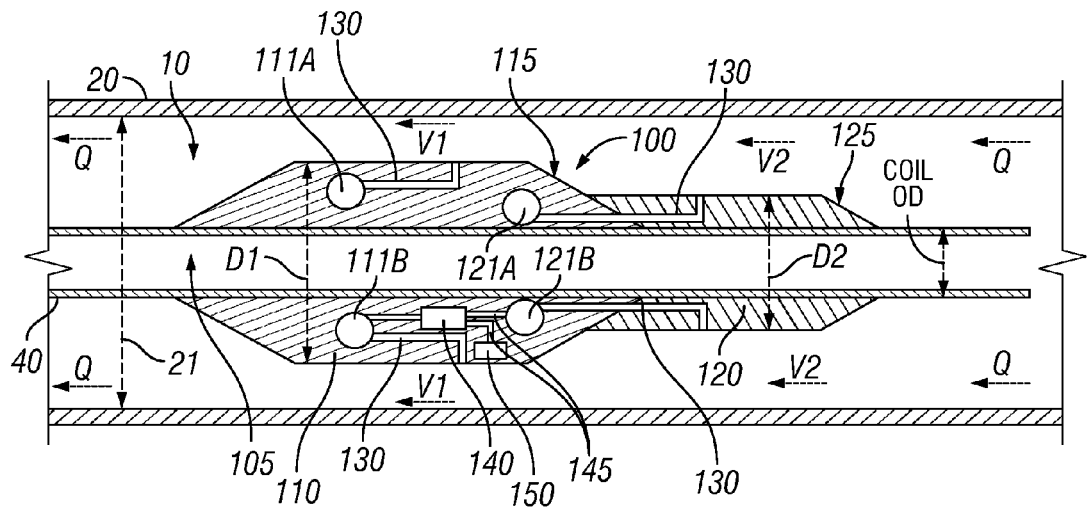
FIG. 1 shows an embodiment of a flow meter positioned on coiled tubing positioned within casing of a wellbore.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

FIG. 1 shows a flow meter 100, also referred to as a flow device or a diverting flow device, positioned within a wellbore 10. The flow meter 100 may be positioned on coiled tubing 40 to locate the flow meter 100 at a desired location within the wellbore 10. The coiled tubing 40 may run through a central bore 105 of the flow meter 100. The flow meter 100 diverts fluid flowing in the wellbore 10 around the exterior of the flow meter 100 so that substantially all of the fluid flows between the exterior of the flow meter 100 and the casing 20, or tubing, or the wellbore 10. The flow meter 100 includes a first portion 110 having a first outer diameter D1 and a second portion 120 having a second outer diameter D2. An angled surface 115 may connect the first portion 110 with the second portion 120. The front end of the flow meter 100 may include an angled surface 125 that reduces the diameter of the flow meter 100 from the second outer diameter D2 to substantially the outer diameter, COIL OD, of the coiled tubing 40. Typically, the first outer diameter D1 is larger than the second outer diameter D2. FIG. 1 shows the smaller portion, the second portion 120, being positioned downhole of the larger portion, the first portion 110, for illustrative purposes only and other orientations are possible. The two portions 110, 120 of the flow meter 100 have different outer diameters, but may be configured differently than shown. For example, a portion of the flow meter 100 having a larger diameter may be positioned downhole with respect to a portion of the flow meter 100 having a smaller diameter. The first portion 110 and the second portion 120 may be concentric, eccentric, or various other configurations as would be appreciated by one of ordinary skill in the art having the benefit of this disclosure. The first portion 110 and second portion 120 may even be formed in a soft or shallow curve.

The flow meter 100 is positioned at a desired location within a wellbore 10 to determine the total flow through the wellbore 10 at that location. The total flow through the wellbore 10 is represented by Q with the arrow indicating the direction of flow. The velocity of the fluid as it flows between the second portion 120 of the flow meter 100 and the casing 20 is represented by V2 with the arrow indicating the direction of flow. The velocity of the fluid as it flows between the first portion 110 of the flow meter 100 and the casing 20 is represented by V1 with the arrow indicating the direction of flow. The first portion 110 of the flow meter 100 may include pressure sensors 111A and 111B that are configured to measure the pressure at the exterior of the first portion 110 of the flow meter 100. The second portion 120 of the flow meter 100 may include pressure sensors 121A and 121B that are configured to measure the pressure at the exterior of the second portion 120 of the flow meter 100. The pressure sensors 111 and 121 are in communication with the exterior of the flow meter 100 via conduits 130. The pressure sensors 111 and 121 are used to determine the flow through the casing 20 at the location of the flow meter 100 as will be discussed herein. The number, configuration, and location of the pressure sensors 111 and 121 for each section 110, 120 of the flow meter may be varied depending on the application as would be appreciated by one of ordinary skill in the art having the benefit of this disclosure.

In fluid dynamics, Bernoulli's principle states that for an inviscid flow, an increase in the speed of the fluid occurs simultaneously with a decrease in pressure or a decrease in the fluid's potential energy. In a steady flow, the sum of all forms of mechanical energy in a fluid along a streamline is the same at all points on the streamline. Using this principle, the measured pressures by the pressure sensors (e.g. 111 and 121) may be used to determine the volumetric flow rate, Q, of the wellbore at the location of the flow meter 100. Because the mechanical energy in a fluid streamline is the same, the following equation holds true, if we discard the gravitational potential, where p is fluid density and where P1 is the pressure and V1 is the velocity at a first point along the streamline and P2 is the pressure and V2 is the velocity at a second point along the streamline.

$$P1 + \frac{1}{2}*\rho*V1^2 = P2 + \frac{1}{2}*\rho*V2^2$$

P1 may be determined from pressure sensors 111A, 111B located along the first portion 110 of the flow sensor 100. P1 may be the average pressure measured from the two, or more, sensors located along the first portion 110 of the flow sensor 100. Likewise, P2 may be determined from pressure sensors 121A, 121B located along the second portion 120 of the flow sensor 100. P2 may be the average pressure measured from the two, or more, sensors located along the second portion 120 of the flow sensor 100. The measured pressures may be recorded in a memory 140 within the flow sensor 100 that is in communication with each sensor 111, 121 via communication lines 145. Alternatively, the measured pressures may be transmitted in real time to the surface as discussed herein. The pressure sensors 111, 121 may be pressure transducers, thermocouples, or other sensors that may be used to measure the fluidic pressure located at the exterior of the flow sensor 100 between the flow sensor 100 and the casing or tubing 20. The pressure sensors 111, 121 may be configured to determine the temperature of the wellbore 10 at the location of the flow sensor 100 and use the temperature reading to accurately determine the actual downhole pressures as would be appreciated by one of ordinary skill in the art having the benefit of this disclosure. The flow sensor 100 may include a sensor 150 that can determine the rotation of the flow meter 100 in reference to the high side of the wellbore 10. Various sensors may be used to determine rotation of the flow meter 100. For example, the sensor 150 may be a mercury bubble or other gravity sensitive sensors. The measurements of the sensor 150 may be stored within memory 140 and/or transmitted to the surface as disclosed herein.

Figure 2:
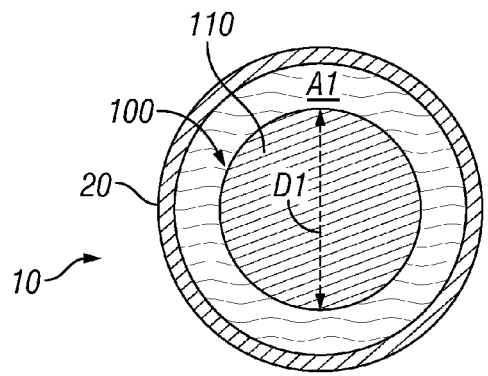
FIG. 2 shows the area between the casing and a first portion of an embodiment of a flow meter.
Figure 3:
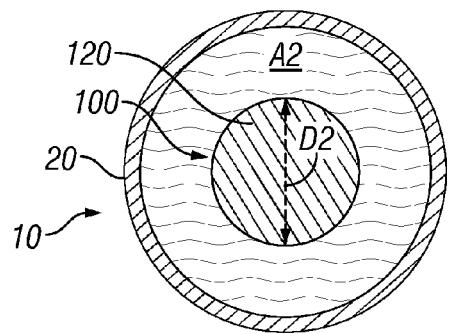
FIG. 3 shows the area between the casing and a second portion of an embodiment of a flow meter.

FIG. 2 shows the flow area A1 between the casing 20 of the wellbore 10 and the first portion 110 of the flow meter 100 and FIG. 3 shows the flow are A2 between the casing 20 of the wellbore 10 and the second portion 110 of the flow meter 100. As discussed above, the sum of all forms of mechanical energy in a fluid along a streamline is the same at all points on the streamline. Thus, the volumetric flow rate, Q, remains constant as the fluid flows past the flow meter 100. The flows areas A1, A2 may be determined based on the casing inner diameter 21 and the diameters D1 and D2 of the two portions 110, 120 of the flow meter 100. Discarding gravitational potential, the following equation expresses the volumetric flow rate with respect to the two flow areas.

$$Q = A1 * V1 = A2 * V2$$

Based on the two equations shown above, the volumetric flow rate, Q, may now be determined using the flow areas, A1 and A2, around the flow meter, the fluid density, $\rho$, and the pressures, P1 and P2, about the exterior portions 110, 120 of the flow meter 100. The equation below sets for the formula for calculating for volumetric flow rate, Q, using the known metrics (flow area) and measurable metrics (pressure and fluid density).

$$Q = A2 \sqrt{\frac{\left(\frac{2}{\rho}\right) * (P1 - P2)}{1 - \left(\frac{A2}{A1}\right)^2}}$$

Figure 4:
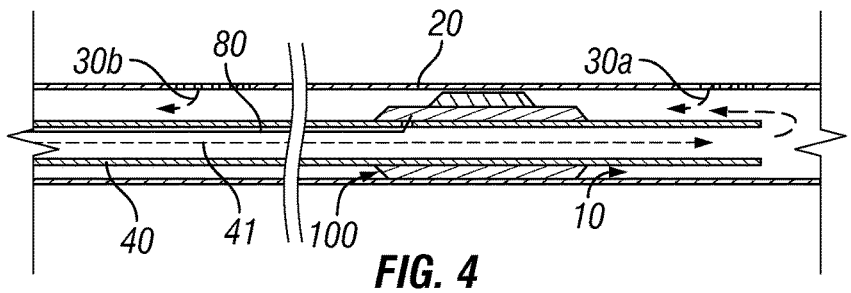
FIG. 4 shows an embodiment of a flow meter positioned adjacent a first zone of a wellbore.
Figure 5:
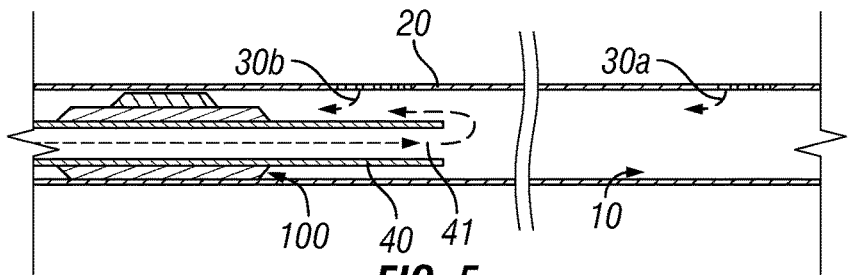
FIG. 5 shows an embodiment of a flow meter positioned adjacent a second zone of a wellbore.

The pressures measured by the flow meter 100 may be used to determine the volumetric flow rate, Q, at a specified location within a wellbore 10. The flow meter 100 may be very useful in helping to determine the hydrocarbon production contribution of a single zone of a wellbore 10. For example, the flow meter 100 may be positioned adjacent the perforations 30a of a first zone in a wellbore 10 as shown FIG. 4. The pressures may be measured by pressure sensors at two or more sections of the flow meter 100. The pressure readings may be transmitted to the surface via a communication line 80, such as an electric line or a fiber optic line, and the volumetric flow rate, Q, adjacent to the first zone may be determine in real time. Alternatively, the pressure measurements may be recorded in memory 140 within the flow meter 100 and subsequently analyzed to determine the volumetric flow rate, Q, when the flow meter 100 is returned to the surface. The flow meter 100 may then be moved and positioned adjacent perforations 30b of a second zone within the wellbore 10 as shown in FIG. 5. The pressures may then be measured again and recorded to determine the volumetric flow rate, Q, adjacent to the second zone of the wellbore 10. If the volumetric flow rate, Q, of a zone is too low to register different pressure readings on the flow meter 100, fluid may be slowly pumped down the coiled tubing 40 as indicated by arrow 41 to increase the flow within the wellbore 10 between the casing 20 and the exterior of the flow meter 100. The flow rate pumped down the coiled tubing 40 may be slowly increased until the volumetric flow rate, Q, may be determined.

Figure 6:
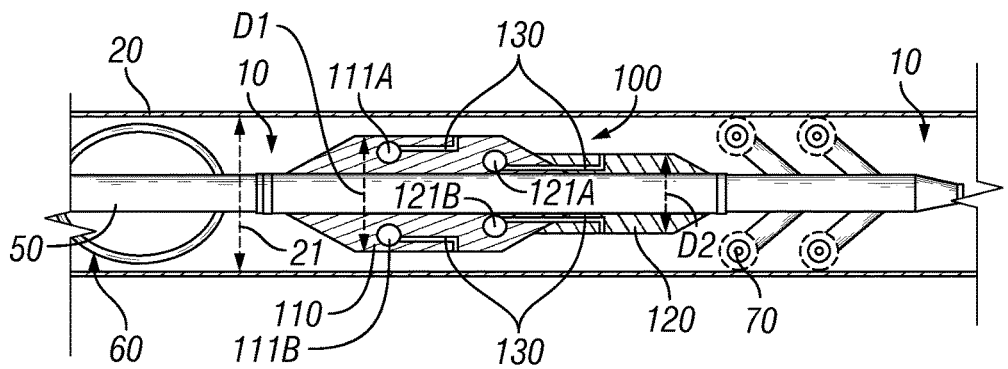
FIG. 6 shows an embodiment of a flow meter connected to wireline.

FIG. 6 shows an embodiment of a flow meter 100 that is conveyed into the wellbore 10 on wireline 50. A tractor 70 may be used to position the flow meter 100 at a desired location along the wellbore 10. A centralizer 60 may be used to ensure that the flow meter 100 is centered within the casing 20 of the wellbore 10. Pressure sensors 111 and 121 may be used to determine the volumetric flow rate, Q, through the wellbore 10 at the location of the flow sensor 100 as discussed herein.

Figure 7:
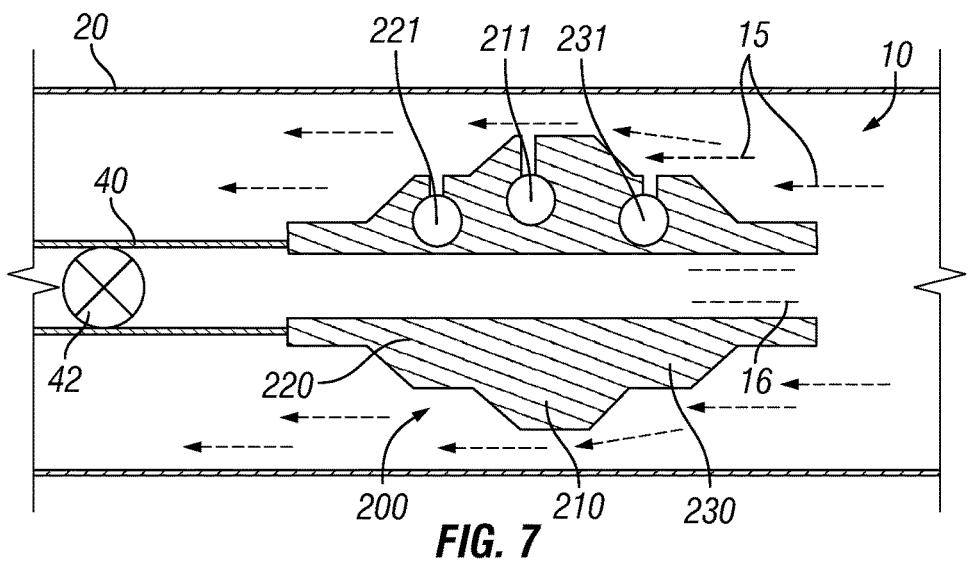
FIG. 7 shows an embodiment of a flow meter.

FIG. 7 shows an embodiment of a flow meter 200 that includes a first portion 210, a second portion 220, and a third portion 230 that each includes at least one pressure sensor 211, 221, and 231 that measure the pressure at the exterior of each respective portion 210, 220, and 230 of the flow sensor 200. Each portion 210, 220, and 230 of the flow meter 200 may have a different outer diameter. Alternatively, one portion, such as the first portion 210, may have a larger outer diameter than the other two portions 220 and 230. Each portion may include a plurality of pressure sensors that are averaged to determine the pressure at the exterior portions of the flow meter. The flow meter 200 may be conveyed into the well via coiled tubing 40. The flow meter 200 diverts substantially all of the fluid flowing through the wellbore 10 around the exterior of the flow meter 200. Fluid may be pumped down the coiled tubing 40 or a valve 42 may be closed within the coiled tubing 40 to encourage the fluid flow around the exterior of the coiled tubing 40. The hydrostatic pressure, schematically shown as lines 16, of fluid within the coiled tubing 40, even if not being pumped down the tubing, may encourage the fluid flow to divert around the flow sensor 200. A valve 42 within the coiled tubing 40 may also be closed to prevent fluid from flowing up the coiled tubing 40.

Figure 8:
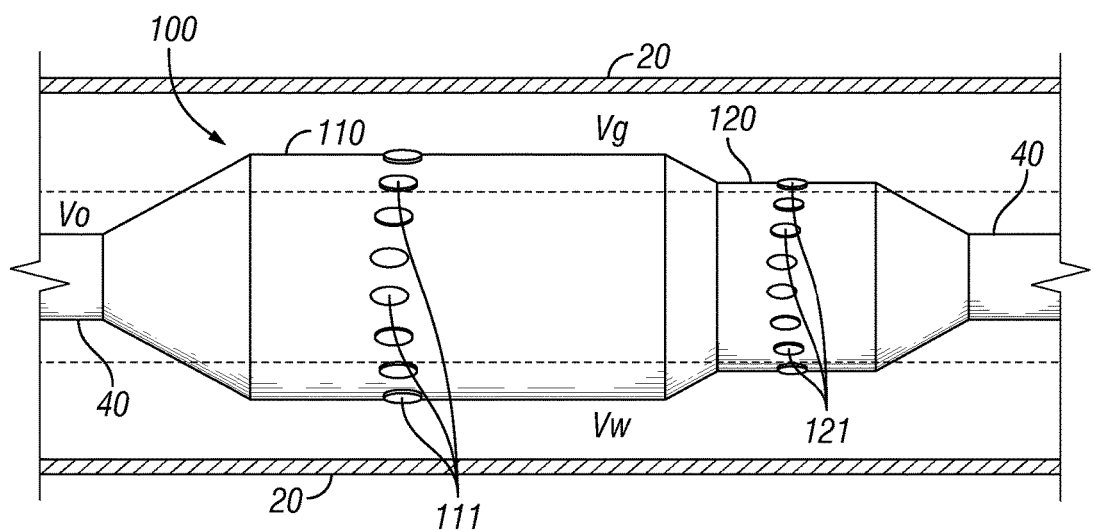
FIG. 8 shows an embodiment of a flow meter on coiled tubing within a wellbore.

FIG. 8 shows an embodiment of a flow meter 100 positioned on coiled tubing 40 within casing 20 of a wellbore 10. The first portion 110 and second portion 120 of the flow meter 100 each have a plurality of sensors 111 and 121 positioned around the exterior of the flow meter 100. The sensors are positioned at various radial intervals so that the flow at the top of the wellbore, middle of the wellbore, and bottom of the wellbore may be monitored. For example, the fluid within the wellbore 10 may be separated in different bands due to separation of the fluids. For example, gas may flow in a top band (shown as Vg), oil may flow in a middle band (shown as Vo), and water may flow in a bottom (shown as Vw). The flow rates of each band may be determined with the flow device includes a plurality of sensors 111 and 121 positioned within each band. For example, the sensors may be positioned around the perimeter of the flow device at every thirty (30) degrees. However, various radial orientations of sensors 111 and 121 may be used to determine the various flow rates as would be appreciated by one of ordinary skill in the art.

Figure 9:
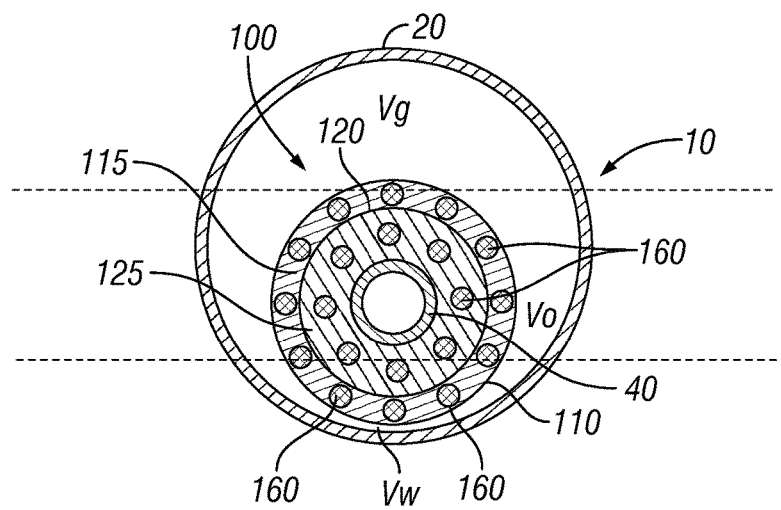
FIG. 9 shows an end view of an embodiment of a flow meter on coiled tubing.

FIG. 9 shows an end view of an embodiment of a flow meter 100 that includes sensors 160 on the flow meter 100 that may be used to determine the laminar flow within the wellbore 10. The flow meter 100 is connected on coiled tubing 40 and positioned within casing 20 at a location that it is desired to measure the flow rate within the wellbore 10. A first plurality of sensors 160 may be positioned on the angled surface 115 between the first portion 110 and the second portion. A second plurality of sensors 160 may be positioned on the angled surface 125 at the end of the flow meter 100. Each individual sensor 160 may measure the conductivity of the fluid adjacent to the sensor 160. Based on the conductivity of the fluid and location of the sensors 160 on the flow meter 100 it may be possible to determine the laminar flow of the fluid within the casing 20. For example, gas, Vg, may be flowing in a top band of the casing 20, oil, Vo, may be flowing in a middle band of the casing 20, and water, Vw, may be flowing in a bottom band of the casing 20. The measurements of the sensors 160 may be stored within the memory 140 and/or transmitted to the surface as disclosed herein.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. A method of measuring production contribution from a zone of a wellbore comprising:
    inserting into a wellbore a flow device, the flow device comprising a central bore that extends from a first end to a second end, a first cylindrical portion having a first outer diameter, a second cylindrical portion having a second outer diameter smaller than the first outer diameter, a first pressure sensor configured to measure a first pressure at an exterior of the first portion, and a second pressure sensor configured to measure a second pressure at an exterior of the second portion, wherein first pressure sensor comprises a first plurality of pressure sensors configured to measure the first pressure at the exterior of the first portion and the second pressure sensor comprises a second plurality of pressure sensors configured to measure the second pressure at the exterior of the second portion;
    positioning the flow device adjacent to a zone of the wellbore;
    measuring the first pressure with the first pressure sensor;
    measuring the second pressure with the second pressure sensor; and
    measuring the first pressure at a top band within the wellbore, measuring the first pressure at a middle band within the wellbore, measuring the first pressure at a bottom band within the wellbore, measuring the second pressure at the top band within the wellbore, measuring the second pressure at the middle band within the wellbore, and measuring the second pressure at the bottom band within the wellbore, wherein at least one of the first plurality of pressure sensors and at least one of the second plurality of pressure sensors is located in the top band within the wellbore, wherein at least one of the first plurality of pressure sensors and at least one of the second plurality of pressure sensors is located in the middle band within the wellbore, and at least one of the first plurality of pressure sensors and at least one of the second plurality of pressure sensors is located in the bottom band within the wellbore; and
    determining fluid flow in the wellbore adjacent to the zone from the first pressure and the second pressure, wherein the entire fluid flow in the wellbore flows around an exterior of the flow device.

2. The method of claim 1, wherein measuring the first pressure further comprises averaging the first pressure measured from the first plurality of sensors and wherein measuring the second pressure further comprises averaging the second pressure measured from the second plurality of sensors.

3. The method of claim 1, wherein inserting into the wellbore the flow device further comprising running the flow device into the wellbore on coiled tubing positioned in the central bore of flow device.

4. The method of claim 3, further comprising pumping fluid down the coiled tubing while measuring the first pressure with the first pressure sensor and measuring the second pressure with the second pressure sensor.

5. The method of claim 3, further comprising transmitting the pressure measurements from the first pressure sensor and the second pressure sensor to a surface.

6. The method of claim 5, wherein the pressure measurements are transmitted on an electric line or fiber optic line.

7. The method of claim 1, further comprising measuring the conductivity of fluid within the wellbore.

8. The method of claim 1, wherein the first pressure sensor and the second pressure sensor are configured to adjust the pressure measurement based on temperature.

9. The method of claim 1, wherein the flow device further comprises a memory to store the pressure measurements from the first pressure sensor and the second pressure sensor.

10. The method of claim 1, further comprising
    positioning the flow device adjacent to a second zone of the wellbore;
    measuring a first pressure adjacent to the second zone with the first pressure sensor;
    measuring the second pressure adjacent to the second zone with the second pressure sensor; and
    determining fluid flow in the wellbore adjacent to the second zone from the first pressure and the second pressure.

11. An apparatus to measure production contribution from a zone of a wellbore, the apparatus comprising:
    a flow meter body having a central bore that extends from a first end to a second end and being configured to be positioned adjacent a zone in a wellbore;
    a first cylindrical portion of the body having a first outer diameter;
    a second cylindrical portion of the body having a second outer diameter smaller than the first outer diameter;
    a first pressure sensor configured to measure a first pressure at an exterior of the first portion;
    a second pressure sensor configured to measure a second pressure at an exterior of the second portion; and
    a memory configured to store pressure measurements from the first pressure sensor and the second pressure sensor; and
    a wireline connected to the body, a centralizer connected to the wireline, and a tractor connected to the wireline, wherein the wireline is positioned within the central bore of the body;
    wherein the body is configured so that an entire fluid flow in a wellbore flows around an exterior of the flow meter body.

12. The apparatus of claim 11 further comprising:
    a third cylindrical portion of the body having a third outer diameter; and
    a third pressure sensor configured to measure a third pressure at an exterior of the third portion, wherein the memory is configured to store pressure measurements from the third pressure sensor.

13. The apparatus of claim 11, the first pressure sensor further comprising a plurality of pressure sensors and the second pressure sensor further comprising a plurality of pressure sensors.

14. The apparatus of claim 11, wherein the body is connected to coiled tubing positioned within the central bore.

15. The apparatus of claim 14, further comprising a communication line connected to the first pressure sensor and the second pressure sensor, the communication line extending from the body to a surface.

16. The apparatus of claim 11, further comprising a plurality of sensors configured to measure the conductivity of fluid within the wellbore.

17. The apparatus of claim 11, further comprising a sensor configured to determine the rotation of the flow meter body with respect to a high side of the wellbore.

18. A system to measure fluid flow in a wellbore, the system comprising:
- a flow meter body, the body having a central bore that extends from a first end to a second end, a first cylindrical portion of the body having a first outer diameter and a second cylindrical portion of the body having a second outer diameter, the second outer diameter being smaller than the first outer diameter;
- a first pressure sensor configured to measure a first pressure between an exterior of the first cylindrical portion and a casing of a wellbore; and
- a second pressure sensor configured to measure a second pressure between an exterior of the second cylindrical portion and the casing of the wellbore; and
- a wireline connected to the body, a centralizer connected to the wireline, and a tractor connected to the wireline, wherein the wireline is positioned within the central bore of the body;
- wherein the flow meter body diverts substantially all fluid flow within the wellbore between an exterior of the flow meter body and the casing of the wellbore.

19. A method of measuring production contribution from a zone of a wellbore comprising:
- inserting into a wellbore a flow device, the flow device comprising a central bore that extends from a first end to a second end, a first cylindrical portion having a first outer diameter, a second cylindrical portion having a second outer diameter smaller than the first outer diameter, a first pressure sensor configured to measure a first pressure at an exterior of the first portion, and a second pressure sensor configured to measure a second pressure at an exterior of the second portion;
- positioning the flow device adjacent to a zone of the wellbore, wherein inserting into the wellbore the flow device further comprises running the flow device into the wellbore on wireline positioned in the central bore of the flow device and using a tractor to position the flow device adjacent to the zone;
- measuring the first pressure with the first pressure sensor;
- measuring the second pressure with the second pressure sensor; and
- determining fluid flow in the wellbore adjacent to the zone from the first pressure and the second pressure, wherein the entire fluid flow in the wellbore flows around an exterior of the flow device.

* * * * *